(12) United States Patent
Nakano et al.

(10) Patent No.: US 11,077,508 B2
(45) Date of Patent: *Aug. 3, 2021

(54) GEAR MACHINING APPARATUS AND GEAR MACHINING METHOD

(71) Applicant: JTEKT Corporation, Osaka (JP)

(72) Inventors: Hiroyuki Nakano, Tokai (JP); Hisashi Otani, Anjo (JP); Shuntaro Takasu, Hekinan (JP)

(73) Assignee: JTEKT Corporation, Osaka (JP)

(*) Notice: Subject to any disclaimer, the term of this patent is extended or adjusted under 35 U.S.C. 154(b) by 6 days.

This patent is subject to a terminal disclaimer.

(21) Appl. No.: 16/571,397

(22) Filed: Sep. 16, 2019

(65) Prior Publication Data
US 2020/0086408 A1 Mar. 19, 2020

(30) Foreign Application Priority Data
Sep. 18, 2018 (JP) .............................. JP2018-173214

(51) Int. Cl.
*B23F 5/12* (2006.01)
(52) U.S. Cl.
CPC ...................................... *B23F 5/12* (2013.01)

(58) Field of Classification Search
CPC ............... B23F 5/12; B23F 5/163; B23F 5/16
See application file for complete search history.

(56) References Cited

U.S. PATENT DOCUMENTS

2018/0126472 A1  5/2018 Zhang et al.

FOREIGN PATENT DOCUMENTS

| JP | 06-061340 U | 8/1994 |
| JP | 2005-152940 A | 6/2005 |
| JP | 2018-079558 A | 5/2018 |

*Primary Examiner* — Alan Snyder
(74) *Attorney, Agent, or Firm* — Oblon, McClelland, Maier & Neustadt, L.L.P.

(57) ABSTRACT

A gear machining apparatus performs cutting work for a workpiece and generates a gear by performing a feed operation of a gear cutter relative to the workpiece along a direction of an axis of the workpiece while synchronously rotating the gear cutter and the workpiece in a state in which an axis of the gear cutter is inclined with respect to a line parallel to the axis of the workpiece. The gear machining apparatus continuously performs cutting work for a first tooth flank and cutting work for a second tooth flank during a single feed operation, and changes a correction angle between the cutting work for the first tooth flank and the cutting work for the second tooth flank.

14 Claims, 15 Drawing Sheets

GEAR MACHINING APPARATUS AND GEAR MACHINING METHOD

INCORPORATION BY REFERENCE

The disclosure of Japanese Patent Application No. 2018-173214 filed on Sep. 18, 2018 including the specification, drawings and abstract, is incorporated herein by reference in its entirety.

BACKGROUND OF THE INVENTION

1. Field of the Invention

The present invention relates to a gear machining apparatus and a gear machining method.

2. Description of the Related Art

A synchromesh mechanism is provided in a transmission for use in a vehicle in order to achieve a smooth shifting operation. As illustrated in FIG. 9, a key type synchromesh mechanism 110 includes a main shaft 111, main drive shafts 112, a clutch hub 113, keys 114, a sleeve 115, main drive gears 116, clutch gears 117, and synchronizer rings 118. The main drive gears 116, the clutch gears 117, and the synchronizer rings 118 are arranged on respective sides of the sleeve 115.

The main shaft 111 and the main drive shafts 112 are arranged coaxially. The clutch hub 113 is spline-fitted to the main shaft 111. The main shaft 111 and the clutch hub 113 rotate together. The keys 114 are supported by springs (not illustrated) at three positions on the outer periphery of the clutch hub 113. Internal teeth (splines) 115a are formed on the inner periphery of the sleeve 115. The sleeve 115 slides in a direction of a rotation axis LL together with the keys 114 along splines (not illustrated) formed on the outer periphery of the clutch hub 113.

The main drive gears 116 are fitted to the main drive shaft 112. The clutch gear 117 is integrally formed on the sleeve 115 side of each of the main drive gears 116. A tapered cone 117b protrudes from the clutch gear 117. The synchronizer ring 118 is arranged between the sleeve 115 and the clutch gear 117. External teeth 117a of the clutch gear 117 and external teeth 118a of the synchronizer ring 118 are formed so as to be meshable with the internal teeth 115a of the sleeve 115. The inner periphery of the synchronizer ring 118 is tapered so as to be brought into friction engagement with the outer periphery of the tapered cone 117b.

Next, description is given of a case where the synchromesh mechanism 110 operates leftward in FIG. 9. The same applies to a case where the synchromesh mechanism 110 operates rightward in FIG. 9. As illustrated in FIG. 10A, the sleeve 115 and the keys 114 move in the direction of the rotation axis LL as indicated by an illustrated arrow through an operation of a shift lever (not illustrated). The keys 114 push the synchronizer ring 118 in the direction of the rotation axis LL to press the inner periphery of the synchronizer ring 118 against the outer periphery of the tapered cone 117b. Thus, the clutch gear 117, the synchronizer ring 118, and the sleeve 115 start to rotate synchronously.

As illustrated in FIG. 10B, the keys 114 are pushed downward by the sleeve 115 to further press the synchronizer ring 118 in the direction of the rotation axis LL. Therefore, the degree of close contact between the inner periphery of the synchronizer ring 118 and the outer periphery of the tapered cone 117b increases to generate a great friction force, thereby causing the clutch gear 117, the synchronizer ring 118, and the sleeve 115 to rotate synchronously. When the number of revolutions of the clutch gear 117 is completely synchronized with the number of revolutions of the sleeve 115, the friction force between the inner periphery of the synchronizer ring 118 and the outer periphery of the tapered cone 117b disappears.

When the sleeve 115 and the keys 114 further move in the direction of the rotation axis LL as indicated by the illustrated arrow, the keys 114 stop by being fitted to grooves 118b of the synchronizer ring 118, but the sleeve 115 moves beyond protrusions 114a of the keys 114. Therefore, the internal teeth 115a of the sleeve 115 mesh with the external teeth 118a of the synchronizer ring 118.

As illustrated in FIG. 10C, the sleeve 115 further moves in the direction of the rotation axis LL as indicated by the illustrated arrow, and the internal teeth 115a of the sleeve 115 mesh with the external teeth 117a of the clutch gear 117. Thus, shifting is completed. The synchromesh mechanism 110 described above is provided with gear slip preventing portion 120 configured to prevent gear slip between the external teeth 117a of the clutch gear 117 and the internal teeth 115a of the sleeve 115 during traveling.

Specifically, as illustrated in FIG. 11 and FIG. 12, the tapered gear slip preventing portion 120 is provided on each internal tooth 115a of the sleeve 115. A tapered gear slip preventing portion 117c to be taper-fitted to the gear slip preventing portion 120 is provided on each external tooth 117a of the clutch gear 117 indicated by dashed lines.

In FIG. 12, the external tooth 117a of the clutch gear 117 is illustrated on the gear slip preventing portion 120 side alone. The gear slip preventing portions 120 illustrated in FIG. 12 are formed symmetrically about an imaginary point at the center of the top land of the internal tooth 115a in the direction of the rotation axis LL of the sleeve 115. In the following description, the face of the internal tooth 115a of the sleeve 115 on the right in FIG. 12 is referred to as a "right face 115B", and the face of the internal tooth 115a of the sleeve 115 on the left is referred to as a "left face 115A".

The right face 115B includes a right tooth flank 115c, a right tapered tooth flank 122, and a right subordinate tooth flank 122a. The right tapered tooth flank 122 is provided on one rotation axis side Df of the sleeve 115 with respect to the right tooth flank 115c. The right subordinate tooth flank 122a is provided between the right tooth flank 115c and the right tapered tooth flank 122. The right tapered tooth flank 122 has a helix angle different from that of the right tooth flank 115c. The right subordinate tooth flank 122a is continuous with the right tooth flank 115c and the right tapered tooth flank 122. The helix angle of the right subordinate tooth flank 122a is different from those of the right tooth flank 115c and the right tapered tooth flank 122.

Similarly, the left face 115A includes a left tooth flank 115b, a left tapered tooth flank 121, and a left subordinate tooth flank 121a. The left tapered tooth flank 121 is provided on the one rotation axis side Df of the sleeve 115 with respect to the left tooth flank 115b. The left subordinate tooth flank 121a is provided between the left tooth flank 115b and the left tapered tooth flank 121. The left tapered tooth flank 121 has a helix angle different from that of the left tooth flank 115b. The left subordinate tooth flank 121a is continuous with the left tooth flank 115b and the left tapered tooth flank 121. The helix angle of the left subordinate tooth flank 121a is different from those of the left tooth flank 115b and the left tapered tooth flank 121.

The right tapered tooth flank 122, the right subordinate tooth flank 122a, the left tapered tooth flank 121, and the left subordinate tooth flank 121a constitute the gear slip preventing portion 120. The gear slip is prevented by taper-fitting the left tapered tooth flank 121 to the gear slip preventing portion 117c.

As described above, the structure of the internal tooth 115a of the sleeve 115 is complicated. The sleeve 115 is a component that needs to be manufactured by mass production. Therefore, the internal teeth 115a of the sleeve 115 are generally formed by broaching or gear shaping, and the gear slip preventing portions 120 is generally formed by form rolling (see Japanese Unexamined Utility Model Application Publication No. 6-61340 (JP 6-61340 U) and Japanese Unexamined Patent Application Publication No. 2005-152940 (JP 2005-152940 A)). However, form rolling is plastic working, and the machining accuracy tends to decrease. In order to increase the machining accuracy, cutting work is desirable. Japanese Unexamined Patent Application Publication No. 2018-79558 (JP 2018-79558 A) discloses a technology for forming the gear slip preventing portion 120 by cutting work.

In the technology described in JP 2018-79558 A, the right subordinate tooth flank 122a (left subordinate tooth flank 121a) is naturally formed when a tool is separated from the right face 115B (left face 115A) after cutting work for the right tapered tooth flank 122 (left tapered tooth flank 121) is performed. As a result, the helix angles of the right subordinate tooth flank 122a and the left subordinate tooth flank 121a are larger in the case where the gear slip preventing portion 120 is formed by cutting work than the case where the gear slip preventing portion 120 is formed by form rolling. In the related art, importance is not placed on dimensional management of the helix angles of the right subordinate tooth flank 122a and the left subordinate tooth flank 121a as compared to those of the right tapered tooth flank 122 and the left tapered tooth flank 121.

It is found that, if the helix angle of the right subordinate tooth flank 122a (left subordinate tooth flank 121a) is excessively large, the synchromesh mechanism may be defective because of failure in smooth operation. Therefore, there is a demand for dimensional management of the right subordinate tooth flank 122a (left subordinate tooth flank 121a) when the gear slip preventing portion 120 is formed by cutting work.

SUMMARY OF THE INVENTION

It is one object of the present invention to provide a gear machining apparatus and a gear machining method in which a plurality of tooth flanks having different helix angles can be formed with high accuracy on the faces of teeth of a gear when the tooth flanks are formed by cutting work.

A gear machining apparatus according to one aspect of the present invention is a gear machining apparatus configured to perform cutting work for a workpiece and generate a gear by performing a feed operation of a gear cutter relative to the workpiece along a direction of an axis of the workpiece while synchronously rotating the gear cutter and the workpiece in a state in which an axis of the gear cutter is inclined with respect to a line parallel to the axis of the workpiece. The gear has a plurality of teeth each having a face including a first tooth flank, and a second tooth flank formed continuous with the first tooth flank and having a helix angle different from a helix angle of the first tooth flank. The gear machining apparatus includes a machining control unit configured to control rotation of the workpiece and rotation of the gear cutter, and control the feed operation of the gear cutter relative to the workpiece.

A position where the gear cutter cuts the face is defined as a cutting point, the cutting point when the cutting work is started is defined as a start point, and the cutting point when the gear cutter is fed by a predetermined feed amount from the start point is defined as a movement point. The cutting point when the gear cutter is fed by the predetermined feed amount from the start point while the workpiece and the gear cutter rotate in a predetermined reference synchronous rotation state is defined as a reference movement point. A phase shift angle to one side in a circumferential direction of the workpiece, which is set to shift a phase of the movement point from a phase of the reference movement point when the gear cutter is fed by the predetermined feed amount from the start point, is defined as a correction angle. The machining control unit is configured to continuously perform the cutting work for the first tooth flank and the cutting work for the second tooth flank during the feed operation performed on a single occasion, and change the correction angle between the cutting work for the first tooth flank and the cutting work for the second tooth flank.

A gear machining method according to another aspect of the present invention is a gear machining method for performing cutting work for a workpiece and generating a gear by performing a feed operation of a gear cutter relative to the workpiece along a direction of an axis of the workpiece while synchronously rotating the gear cutter and the workpiece in a state in which an axis of the gear cutter is inclined with respect to a line parallel to the axis of the workpiece. The gear has a plurality of teeth each having a face including a first tooth flank, and a second tooth flank formed continuous with the first tooth flank and having a helix angle different from a helix angle of the first tooth flank.

A position where the gear cutter cuts the face is defined as a cutting point, the cutting point when the cutting work is started is defined as a start point, and the cutting point when the gear cutter is fed by a predetermined feed amount from the start point is defined as a movement point. The cutting point when the gear cutter is fed by the predetermined feed amount from the start point while the workpiece and the gear cutter rotate in a predetermined reference synchronous rotation state is defined as a reference movement point. A phase shift angle to one side in a circumferential direction of the workpiece, which is set to shift a phase of the movement point from a phase of the reference movement point when the gear cutter is fed by the predetermined feed amount from the start point, is defined as a correction angle. The gear machining method includes continuously performing the cutting work for the first tooth flank and the cutting work for the second tooth flank during the feed operation performed on a single occasion, and changing the correction angle between the cutting work for the first tooth flank and the cutting work for the second tooth flank.

According to the gear machining apparatus and the gear machining method of the aspects described above, the machining control unit continuously performs the cutting work for the first tooth flank and the cutting work for the second tooth flank during the feed operation performed on a single occasion. The machining control unit changes the correction angle between the cutting work for the first tooth flank and the cutting work for the second tooth flank. Thus, the gear machining apparatus can perform dimensional management of both the first tooth flank and the second tooth flank. Accordingly, the first tooth flank and the second tooth flank can be formed with high accuracy.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A gear machining apparatus and a gear machining method according to embodiments of the present invention are described below with reference to the drawings. First, the overall structure of a gear machining apparatus 1 according to one embodiment of the present invention is described with reference to FIG. 1.

Figure 1:
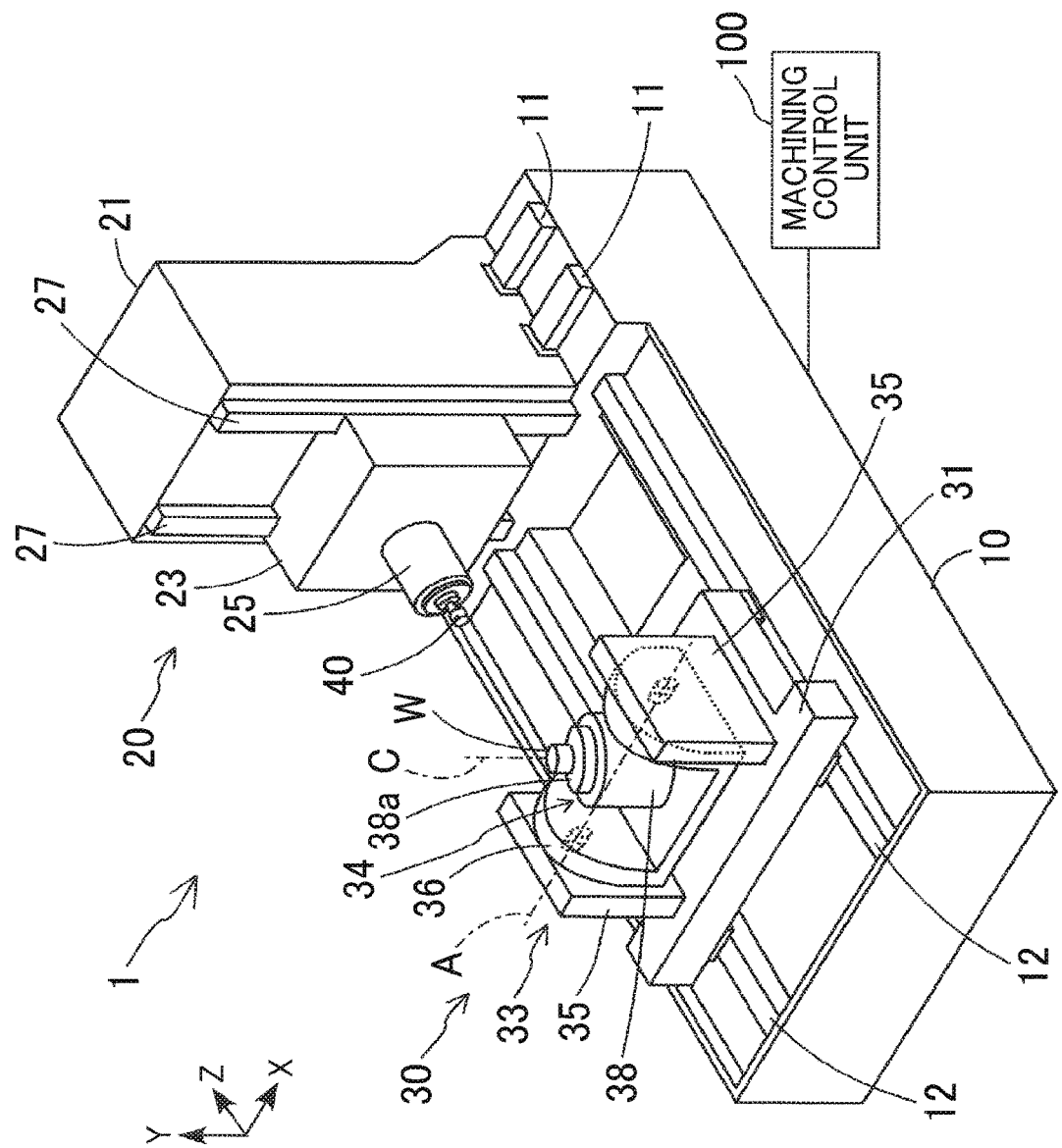
FIG. 1 is a perspective view of a gear machining apparatus according to one embodiment of the present invention.

As illustrated in FIG. 1, the gear machining apparatus 1 is a machining center having three orthogonal linear axes (X-axis, Y-axis, and Z-axis) and two rotation axes (A-axis and C-axis) as driving axes. The gear machining apparatus 1 mainly includes a bed 10, a tool holding device 20, a workpiece holding device 30, and a machining control unit 100.

The bed 10 is arranged on a floor. A pair of X-axis guide rails 11 extending in an X-axis direction and a pair of Z-axis guide rails 12 extending in a Z-axis direction are provided on the upper face of the bed 10. The tool holding device 20 includes a column 21, an X-axis driving device 22 (see FIG. 3), a saddle 23, a Y-axis driving device 24 (see FIG. 3), a tool spindle 25, and a tool spindle motor 26 (see FIG. 3). In FIG. 1, illustrations of the X-axis driving device 22, the Y-axis driving device 24, and the tool spindle motor 26 are omitted.

The column 21 is provided so as to be movable in the X-axis direction while being guided by the X-axis guide rails 11. The X-axis driving device 22 is a screw feed device configured to feed the column 21 in the X-axis direction relative to the bed 10. A pair of Y-axis guide rails 27 extending along a Y-axis direction are provided on the face of the column 21. The saddle 23 is provided so as to be movable in the Y-axis direction relative to the column 21 while being guided by the Y-axis guide rails 27. The Y-axis driving device 24 is a screw feed device configured to feed the saddle 23 in the Y-axis direction.

The tool spindle 25 is supported so as to be rotatable about an axis parallel to the Z-axis direction relative to the saddle 23. A gear cutter 40 is removably attached to the tip of the tool spindle 25, and is used for machining a workpiece W. The gear cutter 40 moves in the X-axis direction along with movement of the column 21, and moves in the Y-axis direction along with movement of the saddle 23. The tool spindle motor 26 applies a driving force for rotating the tool spindle 25, and is housed in the saddle 23.

The workpiece holding device 30 includes a slide 31, a Z-axis driving device 32 (see FIG. 3), a tilting device 33, and a workpiece rotating device 34. In FIG. 1, an illustration of the Z-axis driving device 32 is omitted. The slide 31 is provided so as to be movable in the Z-axis direction relative to the bed 10 while being guided by the Z-axis guide rails 12. The Z-axis driving device 32 is a screw feed device configured to feed the slide 31 in the Z-axis direction.

Figure 3:
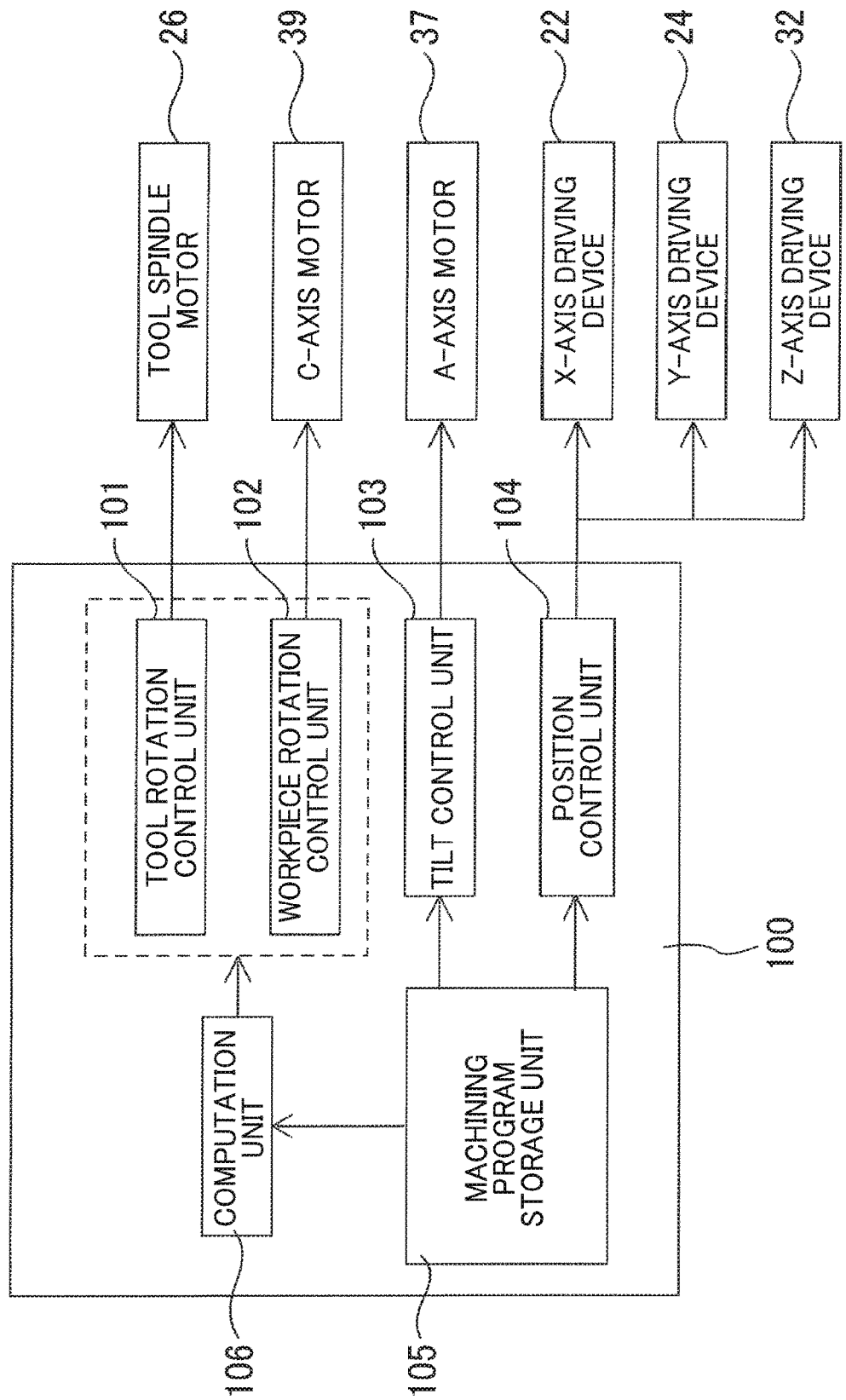
FIG. 3 is a block diagram of a machining control unit.

The tilting device 33 includes a pair of table support portions 35, a tilt table 36, and an A-axis motor 37 (see FIG. 3). The table support portions 35 are arranged on the upper face of the slide 31. The tilt table 36 is supported so as to be pivotable about the A-axis parallel to the X-axis relative to the table support portions 35. The A-axis motor 37 applies a driving force for pivoting the tilt table 36 about the A-axis, and is housed in the table support portion 35.

The workpiece rotating device 34 includes a rotary table 38 and a C-axis motor 39 (see FIG. 3). The rotary table 38 is arranged so as to be rotatable about the C-axis orthogonal to the A-axis relative to the bottom face of the tilt table 36. The rotary table 38 is provided with a holding portion 38a configured to fix the workpiece W. The C-axis motor 39 applies a driving force for rotating the rotary table 38, and is provided on the lower face of the tilt table 36.

When a gear is machined, the gear machining apparatus 1 pivots the tilt table 36 to incline an axis L of the gear cutter 40 with respect to a line parallel to an axis Lw of the workpiece W. In this state, the gear machining apparatus 1 relatively feeds the gear cutter 40 in a direction of the axis Lw of the workpiece W while synchronously rotating the gear cutter 40 and the workpiece W. Thus, the gear machining apparatus 1 generates a gear by cutting work for the workpiece W.

Figure 2:
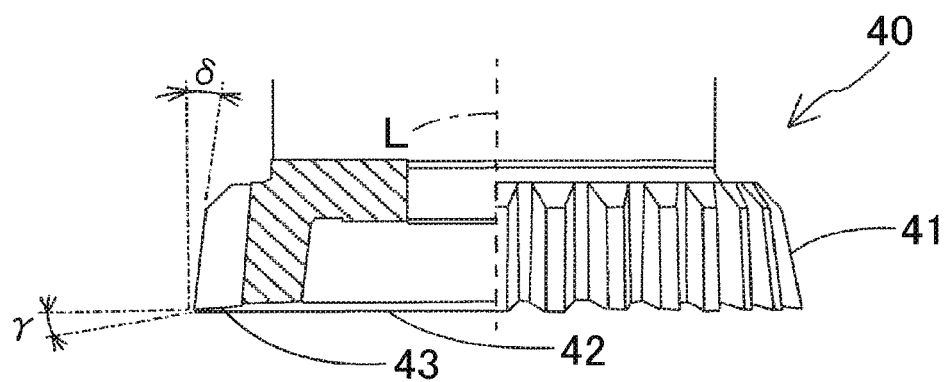
FIG. 2 is a local sectional view of the overall structure of a gear cutter that is viewed in a radial direction.

Next, the schematic overall structure of the gear cutter 40 is described with reference to FIG. 2. As illustrated in FIG. 2, the gear cutter 40 includes a plurality of tool edges 41 having helix angles. Each of the tool edges 41 is formed into a shape of an involute curve when viewed in a direction of the axis L of the gear cutter 40. Each tool edge 41 has a rake face 43 on an end face 42 oriented to the tip of the gear cutter 40 (lower side in FIG. 2). The rake face 43 has a rake angle at which the rake face 43 is inclined by an angle γ with respect to a plane orthogonal to the direction of the axis L of the gear cutter 40. Each tool edge 41 has a front relief angle at which the tool edge 41 is inclined by an angle δ with respect to a straight line parallel to the axis L of the gear cutter 40.

Next, the machining control unit 100 is described with reference to FIG. 3. The machining control unit 100 controls rotation of the workpiece W and rotation of the gear cutter 40, and performs an operation for feeding the gear cutter 40 relative to the workpiece W. As illustrated in FIG. 3, the machining control unit 100 includes a tool rotation control unit 101, a workpiece rotation control unit 102, a tilt control unit 103, a position control unit 104, a machining program storage unit 105, and a computation unit 106.

The tool rotation control unit 101 controls driving of the tool spindle motor 26 to rotate the gear cutter 40 attached to the tool spindle 25. The workpiece rotation control unit 102 controls driving of the C-axis motor 39 to rotate the workpiece W fixed to the rotary table 38 about the axis Lw (about the C-axis). The tilt control unit 103 controls driving of the A-axis motor 37 to pivot the tilt table 36. Thus, the workpiece W fixed to the rotary table 38 pivots about the A-axis, and the axis L of the gear cutter 40 is inclined with respect to the line parallel to the axis Lw of the workpiece W.

The position control unit 104 controls driving of the X-axis driving device 22 to move the column 21 in the X-axis direction, and controls driving of the Y-axis driving device 24 to move the saddle 23 in the Y-axis direction. Thus, the gear cutter 40 held by the tool holding device 20 moves in the X-axis direction and the Y-axis direction relative to the workpiece W held by the workpiece holding device 30. The position control unit 104 controls driving of the Z-axis driving device 32 to move the slide 31 in the Z-axis direction. Thus, the workpiece W held by the workpiece holding device 30 moves in the Z-axis direction relative to the gear cutter 40 held by the tool holding device 20. Accordingly, the gear cutter 40 is fed relative to the workpiece W.

The machining program storage unit 105 stores a machining program to be used for cutting work. The computation unit 106 identifies a machining path along which the gear cutter 40 cuts the workpiece W based on the machining program stored in the machining program storage unit 105.

Based on the identified machining path, the computation unit 106 derives a crossed axes angle α, a correction angle β, and a feed amount F of the gear cutter 40 relative to the workpiece W. The crossed axes angle α is an inclination angle of the axis L of the gear cutter 40 with respect to the axis Lw of the workpiece W, and is determined based on, for example, the profiles of tooth flanks to be formed on the workpiece W and the helix angle of the tool edge 41. Based on the crossed axes angle α computed by the computation unit 106, the tilt control unit 103 causes the tilt table 36 to pivot so that the inclination angle of the axis L of the gear cutter 40 with respect to the axis Lw of the workpiece W is the crossed axes angle α.

Next, the correction angle β is described. In this embodiment, the correction angle β is defined as follows. That is, assuming that a position where the gear cutter 40 cuts the workpiece W is a "cutting point C", a cutting point C when cutting work is started is defined as a "start point S", and a cutting point C when the gear cutter 40 is fed by the predetermined feed amount F from the start point S is defined as a "movement point M". A cutting point C when the gear cutter 40 is fed by the predetermined feed amount F from the start point S while the workpiece W and the gear cutter 40 rotate in a predetermined reference synchronous rotation state is defined as a "reference movement point MR". A phase shift angle to one side in a circumferential direction of the workpiece W, which is set to shift the phase of the movement point M from that of the reference movement point MR when the gear cutter 40 is fed by the predetermined feed amount F from the start point S, is defined as the "correction angle β".

The "reference synchronous rotation state" is a state in which the workpiece W and the gear cutter 40 rotate synchronously so that the cutting point C that will move along with the feed operation moves along a helix direction of a tooth of a gear to be formed on the workpiece W. If a helical gear is formed on the workpiece W, the reference synchronous rotation state is a state in which the workpiece W and the gear cutter 40 rotate synchronously so that the cutting point C moves along a helix direction of the gear to be formed on the workpiece W. If a spur gear is formed on the workpiece W, the reference synchronous rotation state is a state in which the workpiece W and the gear cutter 40 rotate synchronously so that the cutting point C moves along the direction of the axis Lw of the workpiece W.

That is, the machining control unit 100 can move the cutting point C along a direction of a tooth trace of a gear to be formed on the workpiece W by performing the feed operation while rotating the workpiece W and the gear cutter 40 in the reference synchronous rotation state. The machining control unit 100 can move the cutting point C in a direction different from the direction of the tooth trace by performing the feed operation in a state in which the workpiece W and the gear cutter 40 rotate at a rotation speed ratio different from that in the reference synchronous rotation state.

In this embodiment, the machining control unit 100 changes the rotation speed ratio between the workpiece W and the gear cutter 40 (hereinafter referred to simply as the "rotation speed ratio") by changing the rotation speed of the workpiece W while keeping a constant rotation speed of the gear cutter 40. In this case, the machining control unit 100 can shift the phase of the movement point M from the phase of the reference movement point MR to the one side in the circumferential direction of the workpiece W by increasing the rotation speed of the workpiece W as compared to that in the reference synchronous rotation state. The machining control unit 100 can shift the phase of the movement point M from the phase of the reference movement point MR to the other side in the circumferential direction of the workpiece W by reducing the rotation speed of the workpiece W as compared to that in the reference synchronous rotation state.

Thus, the machining control unit 100 can smoothly change the rotation speed ratio by changing the rotation speed of the workpiece W while keeping the constant rotation speed of the gear cutter 40. In this embodiment, the rotation speed of the workpiece W is changed while keeping the constant rotation speed of the gear cutter 40, but the rotation speed of the gear cutter 40 may be changed while keeping a constant rotation speed of the workpiece W.

In this case, the phase shift angle of the movement point M from the reference movement point MR increases as the feed amount F in the feed operation increases. Therefore, it is necessary to determine the rotation speed ratio based on the correction angle β and the feed amount F. The machining control unit 100 identifies the machining path based on the machining program, derives the correction angle β and the feed amount F based on the machining path, and computes the rotation speed ratio by using the correction angle β and the feed amount F.

Figure 11:
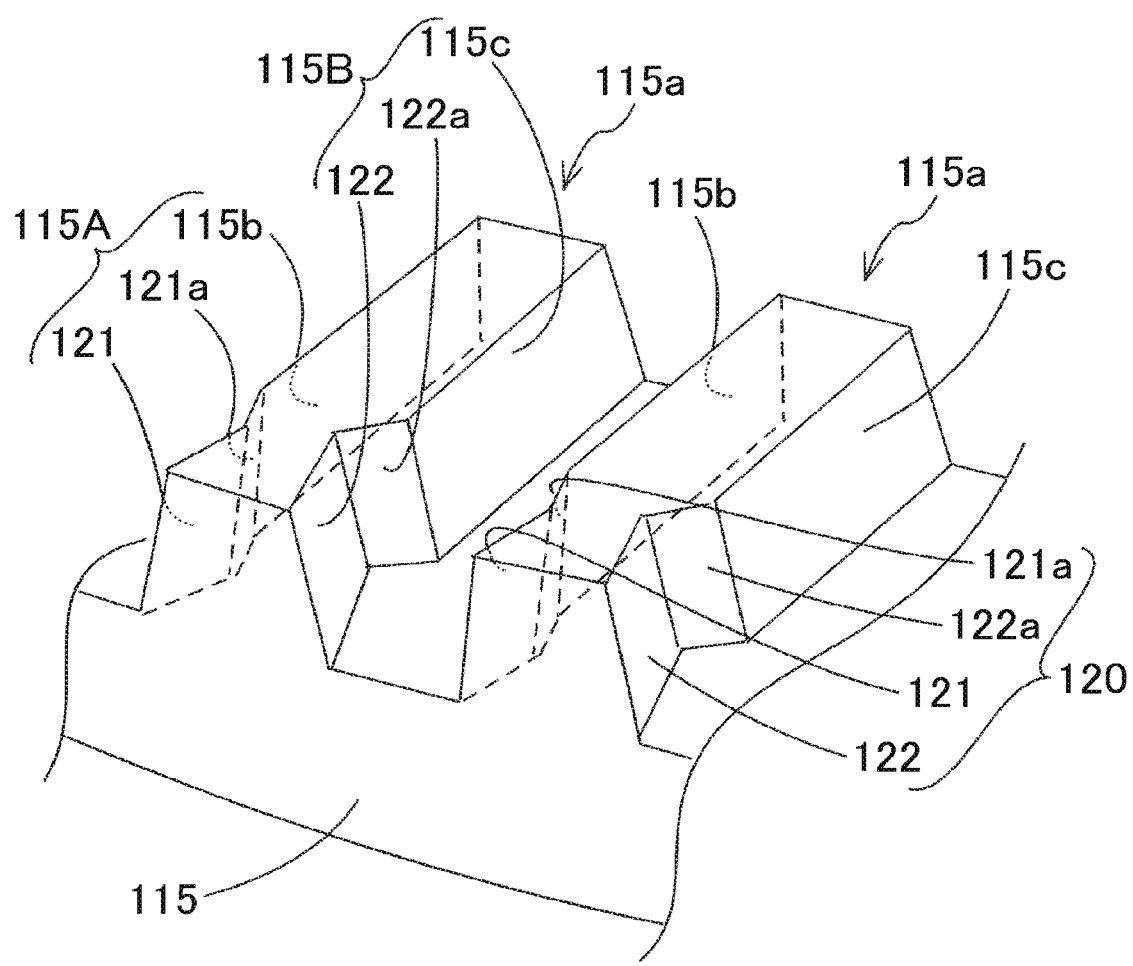
FIG. 11 is a perspective view illustrating gear slip preventing portions of the sleeve.
Figure 12:
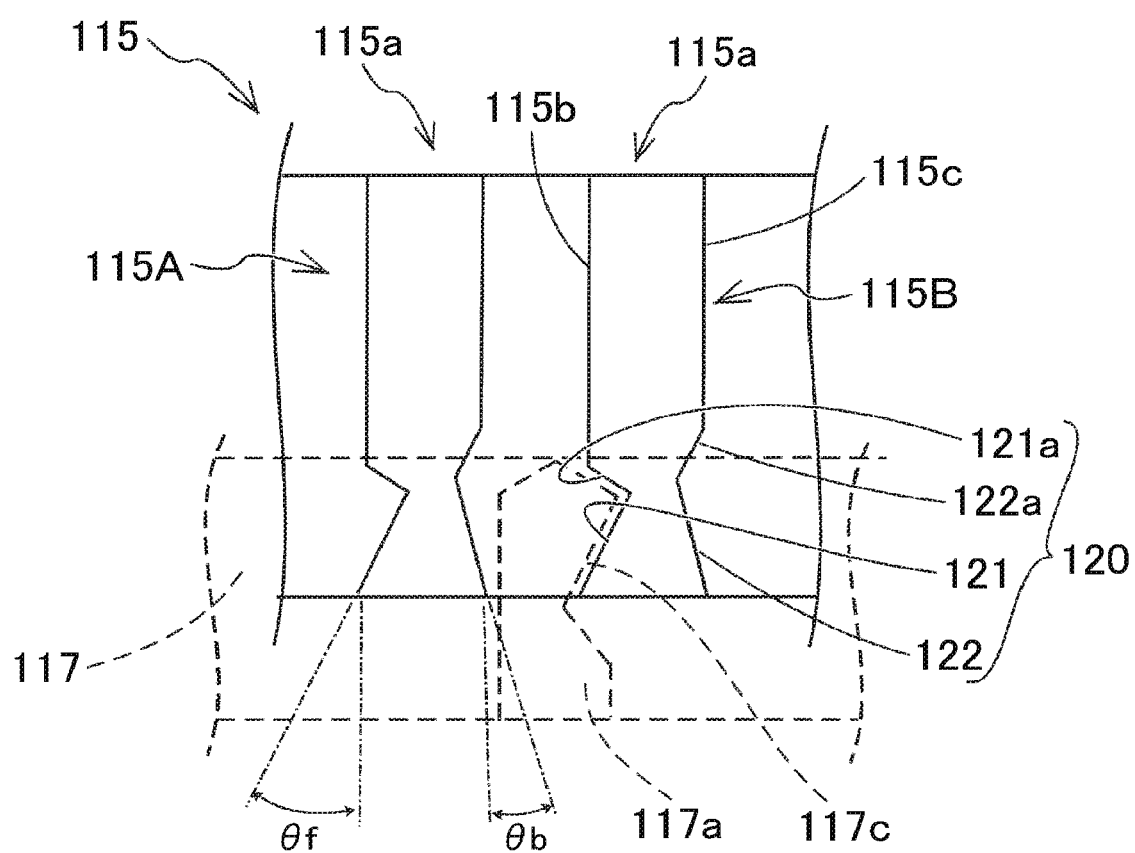
FIG. 12 is a view schematically illustrating a state of the gear slip preventing portions of the sleeve illustrated in FIG. 11 in the radial direction.

Next, a specific example of the correction angle β is described with reference to FIG. 4A and FIG. 4B. Description is given of a case of forming a right tapered tooth flank 122 and a right subordinate tooth flank 122a of a gear slip preventing portion 120 illustrated in FIG. 11 and FIG. 12.

Figure 4A:
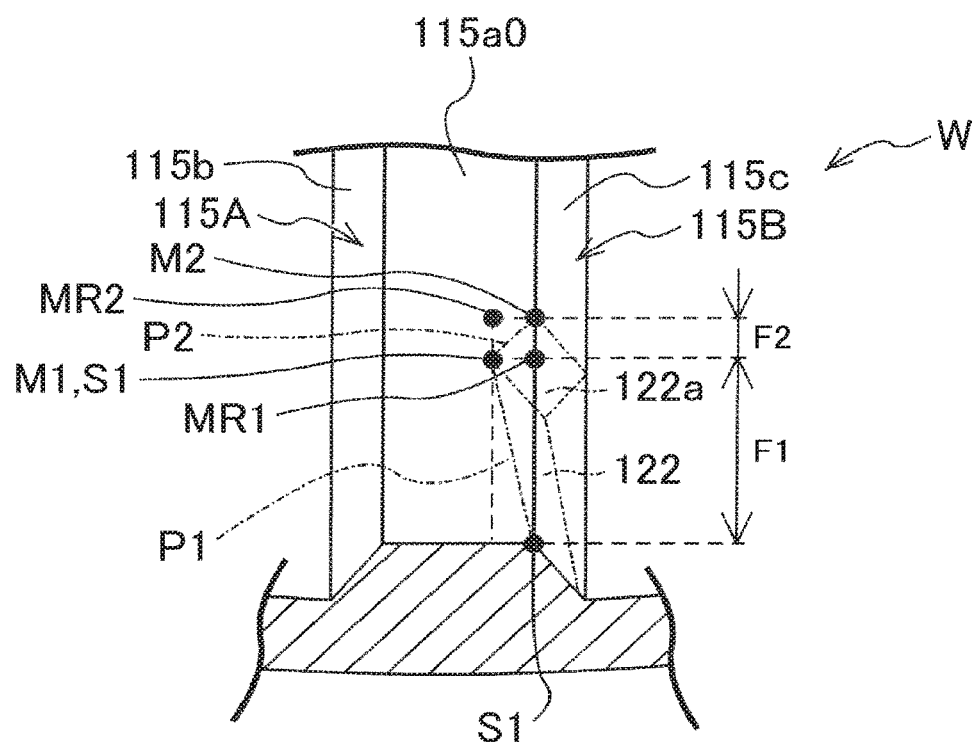
FIG. 4A is a view partially illustrating a spline tooth that is viewed obliquely from the top.
Figure 4B:
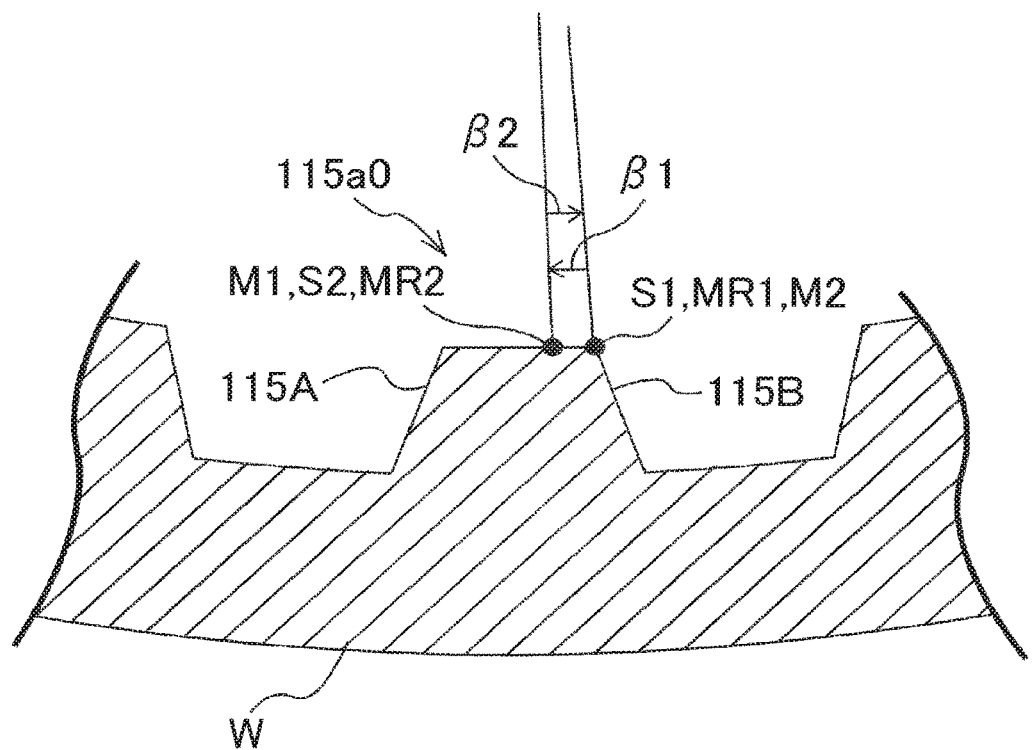
FIG. 4B is a view partially illustrating a workpiece in an axial direction.

FIG. 4A and FIG. 4B illustrate a state after a spline tooth 115a0 is formed on the inner peripheral surface of the workpiece W. The spline tooth 115a0 has a right tooth flank 115c and a left tooth flank 115b formed over the entire areas of a right face 115B and a left face 115A, respectively. The gear machining apparatus 1 forms the right tapered tooth flank 122 and the right subordinate tooth flank 122a on the right tooth flank 115c of the spline tooth 115a0 by moving the cutting point C along a machining path indicated by long dashed short dashed lines. In FIG. 4A and FIG. 4B, the end face of the workpiece W is hatched for clear illustration.

As illustrated in FIG. 4A and FIG. 4B, the direction of the tooth trace of the spline tooth 115a0 is parallel to the axis Lw of the workpiece W. The machining path includes a first path P1 and a second path P2. The cutting point C moves along the first path P1 when the right tapered tooth flank 122 is formed. The cutting point C moves along the second path P2 when the right subordinate tooth flank 122a is formed. The first path P1 and the second path P2 are inclined with respect to the axis Lw of the workpiece W.

The computation unit 106 first computes a rotation speed ratio for cutting work along the first path P1. Specifically, after the first path P1 is identified, the computation unit 106 derives a start point S1 and a movement point M1 based on the first path P1. The computation unit 106 derives a feed amount F1 for moving the cutting point C along the first path P1 based on the start point S1 and the movement point M1, and derives a reference movement point MR1 based on the start point S1 and the feed amount F1. Then, the computation unit 106 derives a correction angle β1 based on the reference movement point MR1 and the movement point M1. The movement point M1 is located on the one side in the circumferential direction of the workpiece W (left side in FIG. 4B) with respect to the reference movement point MR1, and therefore the correction angle β1 is a positive value. Then, the computation unit 106 computes a rotation speed ratio by using the correction angle β1 and the feed amount F1.

Similarly, the computation unit 106 computes a rotation speed ratio for formation along the second path P2. In this case, the computation unit 106 identifies a start point S2 and a movement point M2 of the second path P2 based on the second path P2. On the second path P2, the start point S2 is located at the same position as that of the movement point M1 of the first path P1. The computation unit 106 derives a correction angle β2 based on a reference movement point MR2 and the movement point M2, and derives a feed amount F2 based on the start point S2 and the movement point M2. The movement point M2 is located on the other side in the circumferential direction of the workpiece W (right side in FIG. 4B) with respect to the reference movement point MR2, and therefore the correction angle β2 is a negative value. Then, the computation unit 106 computes a rotation speed ratio by using the correction angle β2 and the feed amount F2.

Figure 5:
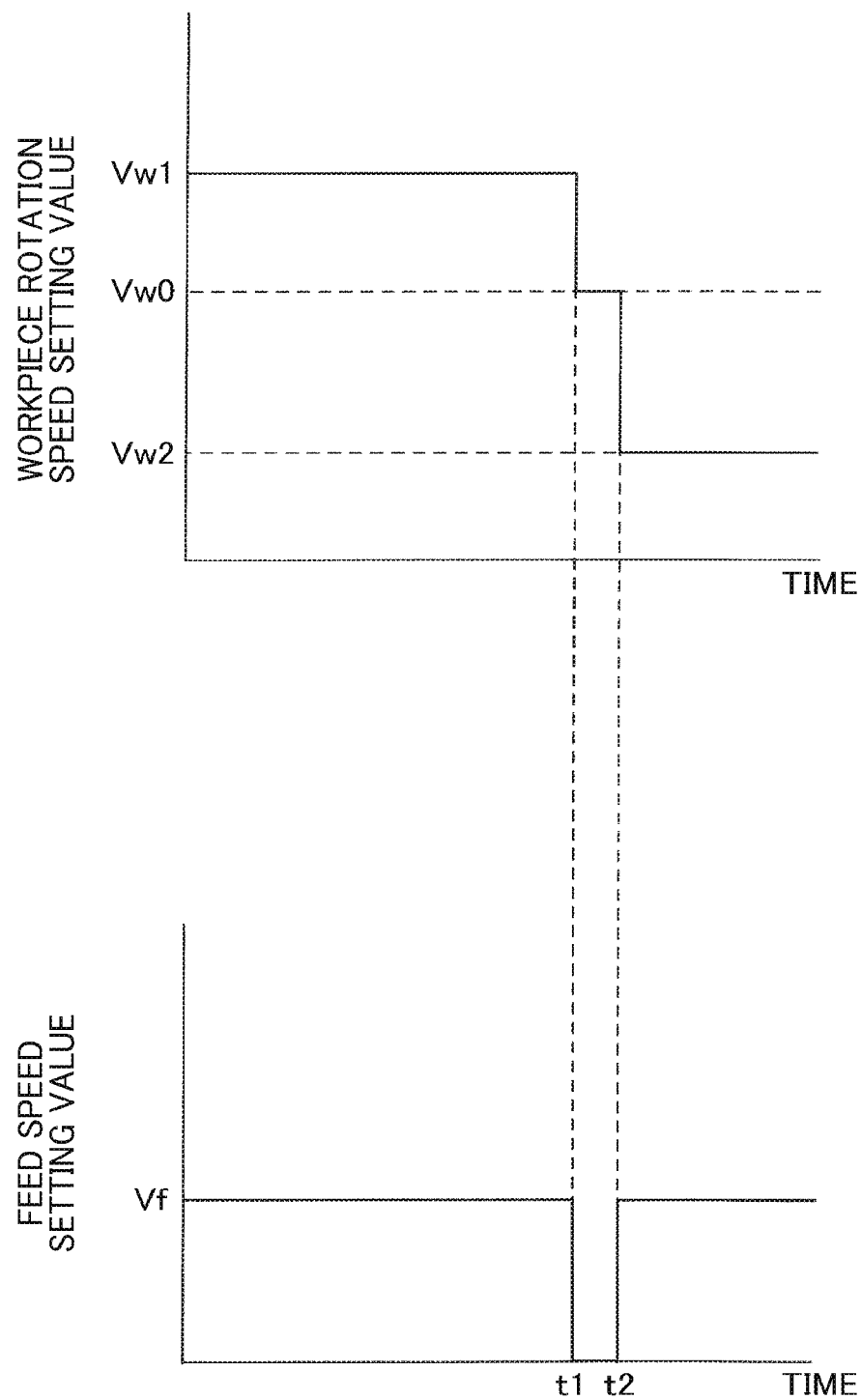
FIG. 5 is a graph illustrating a relationship between a workpiece rotation speed setting value and a feed speed setting value when cutting work for a right tapered tooth flank and a right subordinate tooth flank is performed.

An operation of the gear machining apparatus 1 when the right tapered tooth flank 122 and the right subordinate tooth flank 122a are formed on the right tooth flank 115c is described with reference to FIG. 5 to FIG. 7C. A horizontal axis of a graph illustrated in FIG. 5 represents an elapsed time from the start of a feed operation. Further, t1 represents a time when a feed operation for cutting work for the right tapered tooth flank 122 is finished, and t2 represents a time when a feed operation for cutting work for the right subordinate tooth flank 122a is started.

Figure 6:
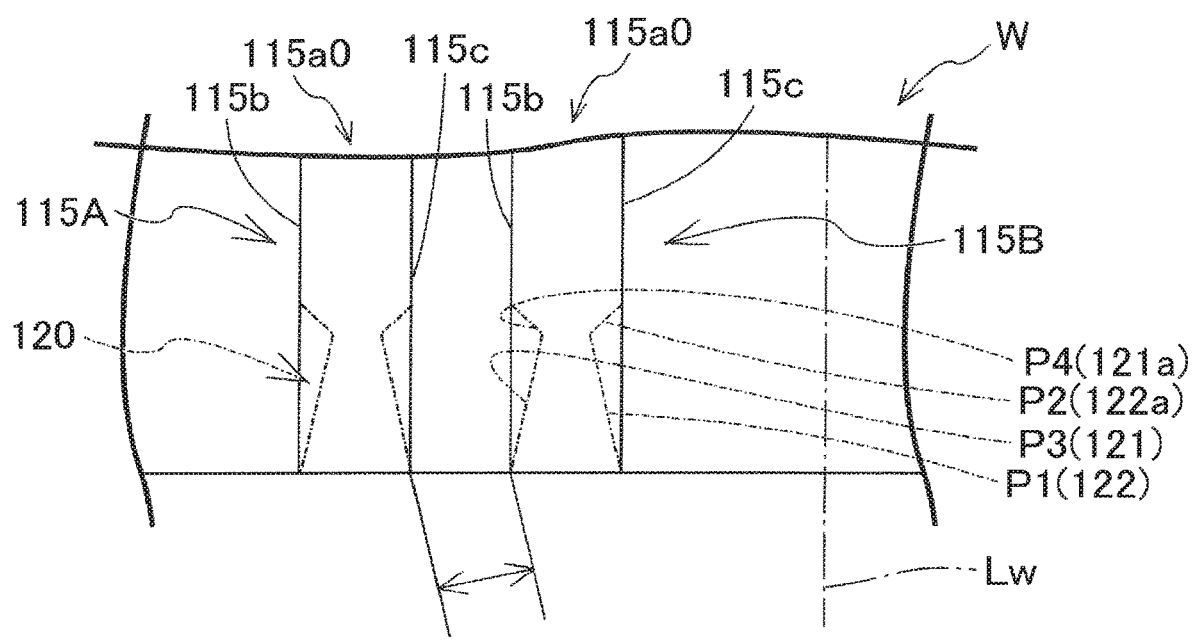
FIG. 6 is a view schematically illustrating a state of the spline teeth that are viewed in the radial direction.

FIG. 6 illustrates the workpiece W after the spline teeth 115a0 are formed. FIG. 6 illustrates only a subset of the spline teeth 115a0. The first path P1, the second path P2, a third path P3, and a fourth path P4 are indicated by long dashed short dashed lines. The first path P1 and the second path P2 are machining paths when the right tapered tooth flank 122 and the right subordinate tooth flank 122a are formed. The third path P3 and the fourth path P4 are machining paths when a left tapered tooth flank 121 and a left subordinate tooth flank 121a are formed.

Figure 7A:
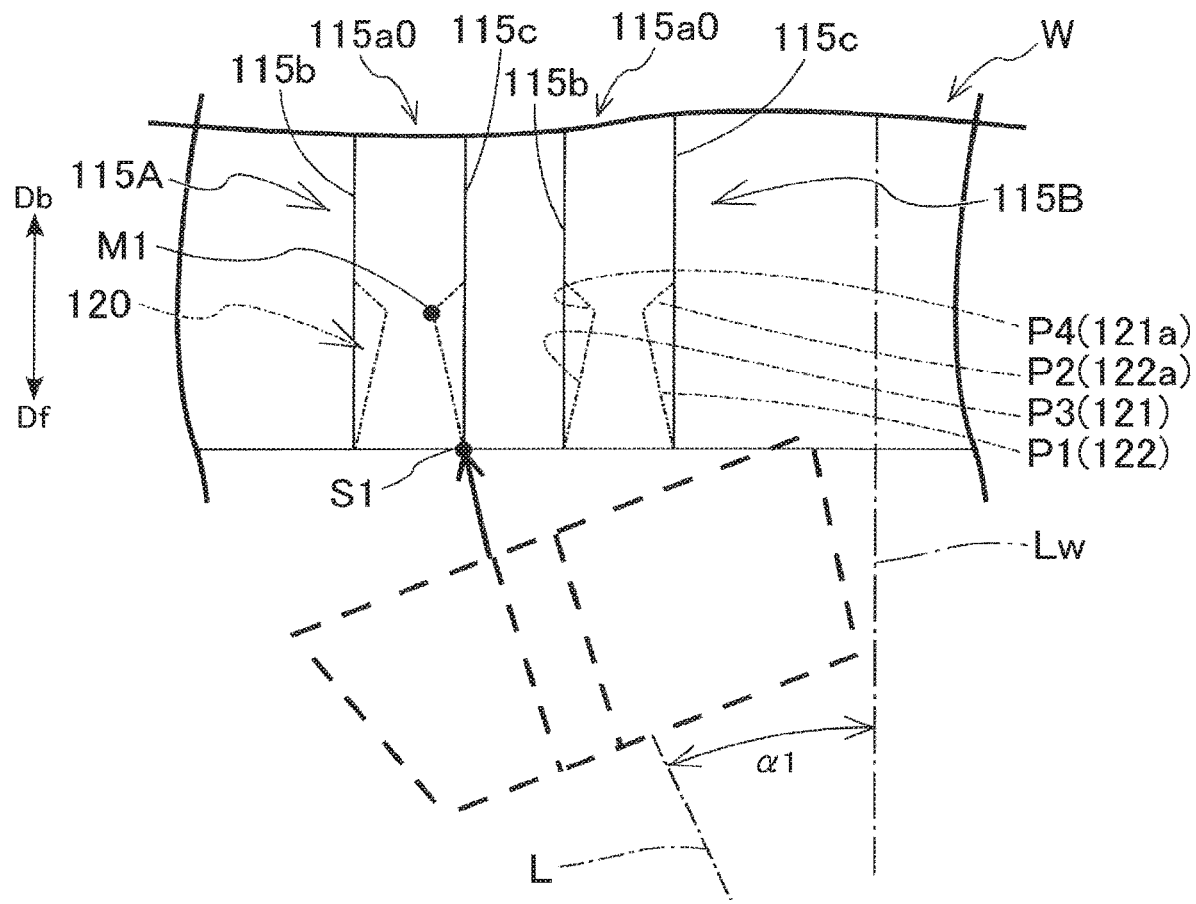
FIG. 7A is a view schematically illustrating a relative position of the gear cutter to the workpiece, and also illustrating a state before cutting work for the right tapered tooth flank is started.

As illustrated in FIG. 5 and FIG. 7A, when the right tapered tooth flank 122 is formed, the machining control unit 100 moves the cutting point C from the start point S1 to the movement point M1 by performing a feed operation from the one rotation axis side Df to the other rotation axis side Db on the workpiece W while rotating the workpiece W and the gear cutter 40 at a rotation speed ratio computed in advance by the computation unit 106. Since the correction angle β1 is a positive value, the workpiece rotation control unit 102 sets a rotation speed Vw1 of the workpiece W to be higher than a rotation speed Vw0 in the reference synchronous rotation state. At this time, the machining control unit 100 keeps a constant feed speed (Vf).

Figure 7B:
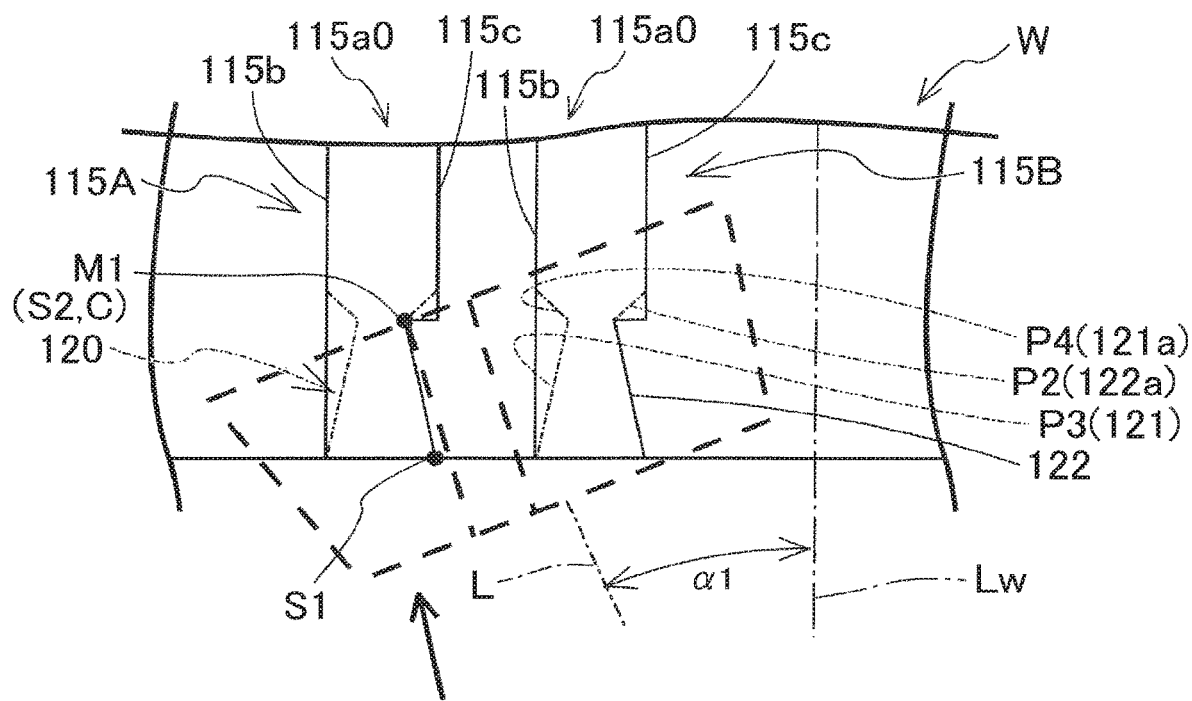
FIG. 7B is a view schematically illustrating a relative position of the gear cutter to the workpiece, and also illustrating a state in which the cutting work for the right tapered tooth flank is finished.

As illustrated in FIG. 5 and FIG. 7B, when the feed operation for the cutting work for the right tapered tooth flank 122 is finished (time t1 illustrated in FIG. 5), the machining control unit 100 temporarily stops the feed operation, and sets the rotation speed of the workpiece W to Vw0. That is, the gear machining apparatus 1 brings the workpiece W and the gear cutter 40 into the reference synchronous rotation state. The computation unit 106 computes a rotation speed ratio for movement of the cutting point C along the second path P2.

Figure 7C:
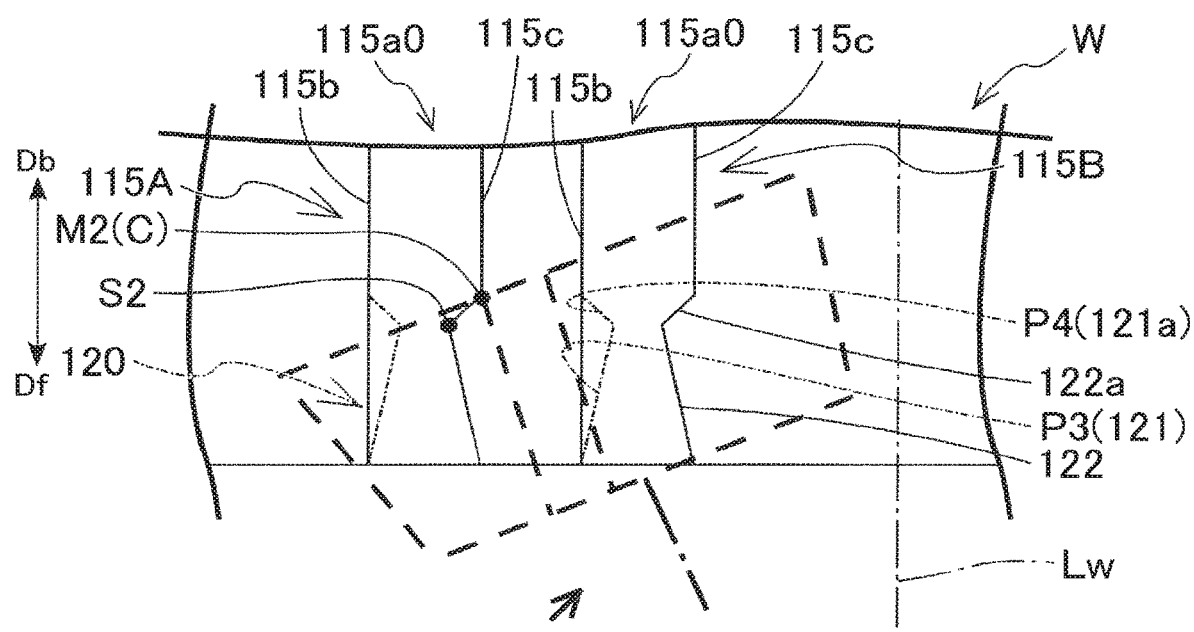
FIG. 7C is a view schematically illustrating a relative position of the gear cutter to the workpiece, and also illustrating a state in which cutting work for the right subordinate tooth flank is finished.

As illustrated in FIG. 5 and FIG. 7C, when the computation of the rotation speed ratio is finished (time t2 illustrated in FIG. 5), the machining control unit 100 changes the rotation speed of the workpiece W from Vw0 to Vw2 based on the computed rotation speed ratio. The machining control unit 100 moves the cutting point C to the movement point M2 by resuming the feed operation from the one rotation axis side Df to the other rotation axis side Db. Since the correction angle β2 is a negative value, the workpiece rotation control unit 102 sets the rotation speed Vw2 of the workpiece W to be lower than the rotation speed Vw0 in the reference synchronous rotation state. At this time, the machining control unit 100 keeps the constant feed speed (Vf).

When the cutting work for the right subordinate tooth flank 122a is finished, the machining control unit 100 temporarily stops the rotation of the workpiece W and the rotation of the gear cutter 40, and performs a returning operation for the gear cutter 40. That is, the machining control unit 100 feeds the gear cutter 40 from the other rotation axis side Db to the one rotation axis side Df to move the gear cutter 40 to a point where cutting work for forming the left tapered tooth flank 121 and the left subordinate tooth flank 121a is started. The machining control unit 100 adjusts the phases of the spline teeth 115a0 formed on the workpiece W and the tool edges 41 of the gear cutter 40, and then performs the cutting work for the left tapered tooth flank 121 and the left subordinate tooth flank 121a through procedures similar to those of the cutting work for the right tapered tooth flank 122 and the right subordinate tooth flank 122a.

As described above, the machining control unit 100 continuously performs the cutting work for the right tapered tooth flank 122 and the cutting work for the right subordinate tooth flank 122a during a single feed operation. The machining control unit 100 changes the correction angle β between the cutting work for the right tapered tooth flank 122 and the cutting work for the right subordinate tooth flank 122a. Thus, the gear machining apparatus 1 can perform dimensional management of both the right tapered tooth flank 122 and the right subordinate tooth flank 122a. Accordingly, the right tapered tooth flank 122 and the right subordinate tooth flank 122a can be formed with high accuracy.

In this case, the machining control unit 100 changes the correction angle β in a state in which the workpiece W and the gear cutter 40 rotate. Thus, the gear machining apparatus 1 can reduce a cycle time as compared to, for example, a case where the gear cutter 40 is separated from the workpiece W, the rotation of the workpiece W and the rotation of the gear cutter 40 are temporarily stopped, and the phases are adjusted again.

Next, special tooth profile machining processing to be executed by the machining control unit 100 is described with reference to a flowchart illustrated in FIG. 8. The special tooth profile machining processing is executed when the spline teeth 115a0 are formed on the inner peripheral surface of the workpiece W and then the right tapered tooth flank 122 and the right subordinate tooth flank 122a are formed on each right face 115B.

Figure 8:
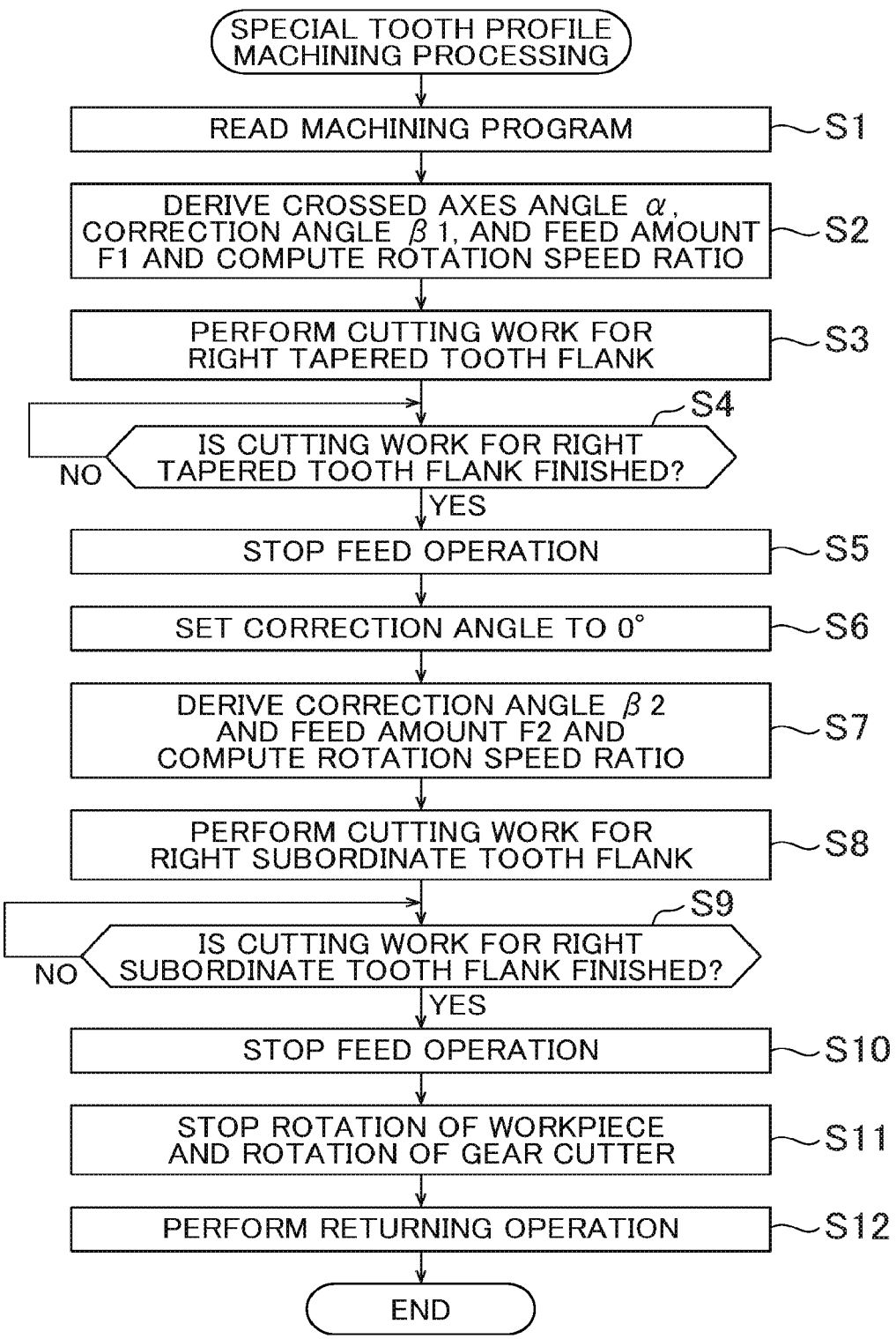
FIG. 8 is a flowchart illustrating special tooth profile machining processing to be executed by the machining control unit.
Figure 9:
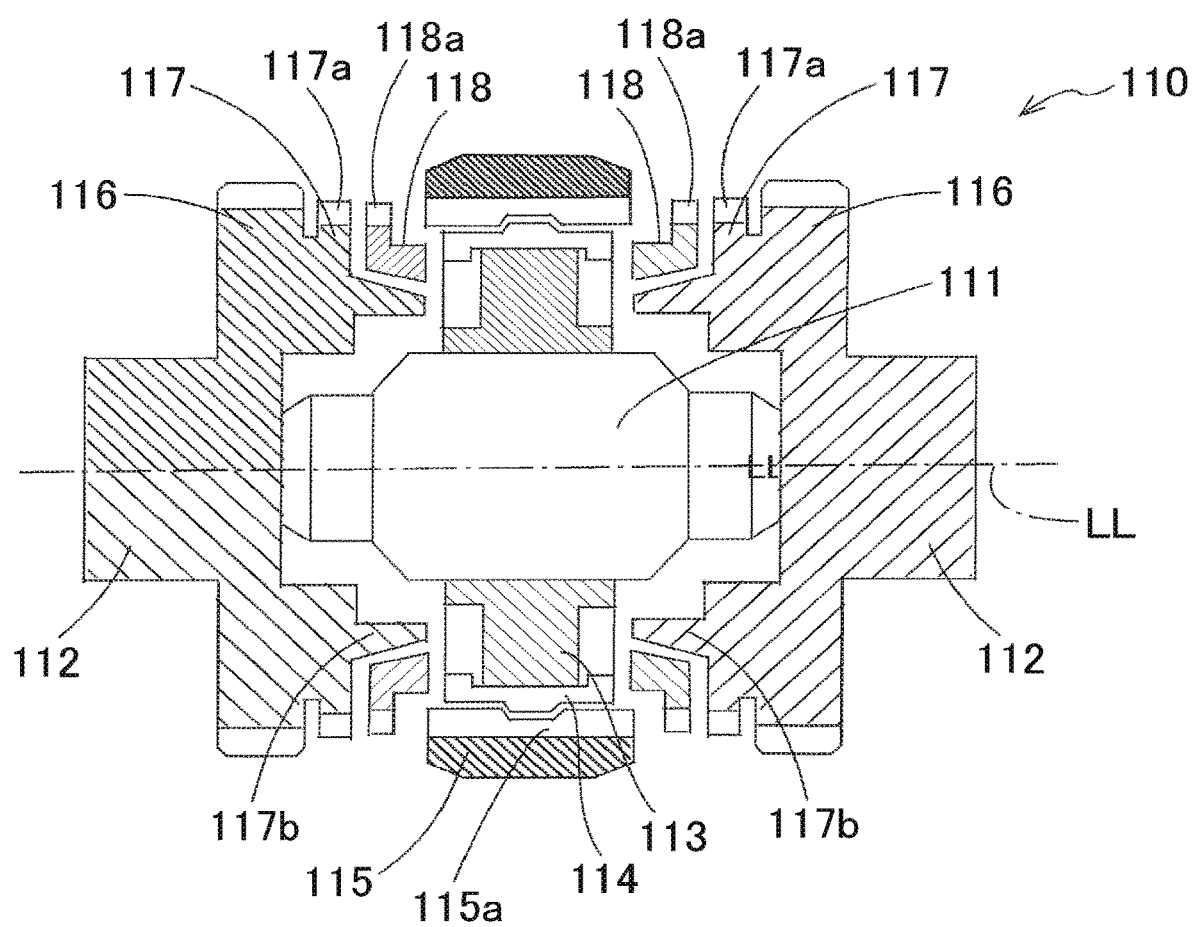
FIG. 9 is a sectional view illustrating a synchromesh mechanism including a sleeve.
Figure 10A:
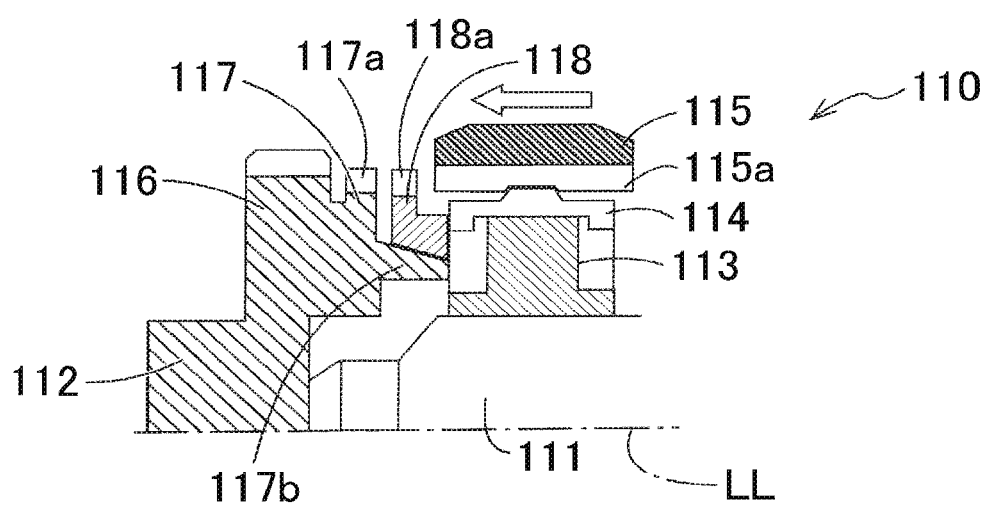
FIG. 10A is a sectional view illustrating a state before the synchromesh mechanism illustrated in FIG. 9 starts to operate.
Figure 10B:
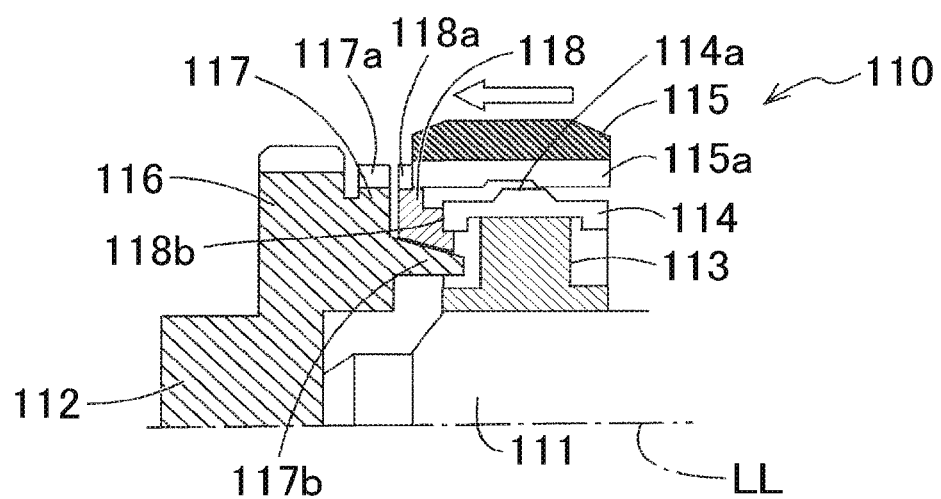
FIG. 10B is a sectional view illustrating a state in which the synchromesh mechanism illustrated in FIG. 9 is operating.
Figure 10C:
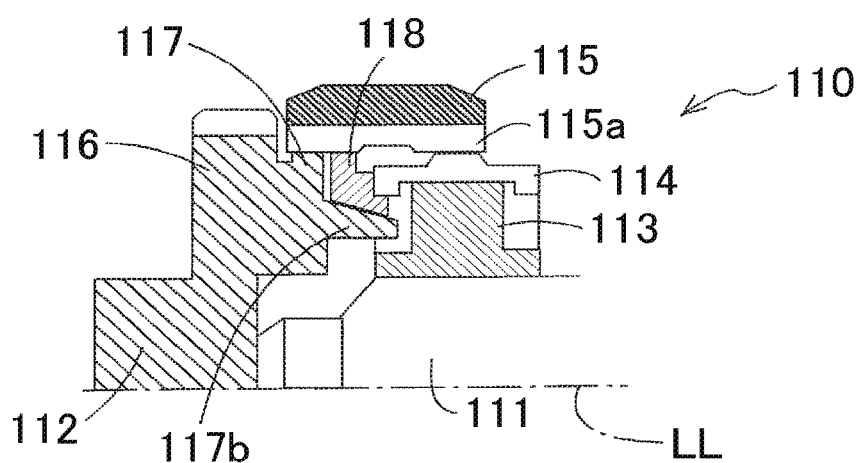
FIG. 10C is a sectional view illustrating a state after the synchromesh mechanism illustrated in FIG. 9 completes operating.

As illustrated in FIG. 8, the machining control unit 100 first reads the machining program stored in the machining program storage unit 105 in the special tooth profile machining processing (S1). The machining control unit 100 identifies the first path P1 and the second path P2 based on the machining program. Then, the machining control unit 100 derives the crossed axes angle α, the correction angle β1, and the feed amount F1 based on the first path P1, and computes a rotation speed ratio (S2). Then, the machining control unit 100 performs cutting work for the right tapered tooth flank 122 by performing a feed operation from the one rotation axis side Df to the other rotation axis side Db while rotating the workpiece W and the gear cutter 40 at the computed rotation speed ratio (S3: first cutting step).

Processing of S4 involves determining whether the cutting work for the right tapered tooth flank 122 is finished. When the cutting work for the right tapered tooth flank 122 is not finished (S4: No), the machining control unit 100 repeats the processing of S4. When the cutting work for the right tapered tooth flank 122 is finished (S4: Yes), the machining control unit 100 stops the feed operation (S5), and sets the correction angle to 0° (S6). That is, in the processing of S5 and the processing of S6, the gear machining apparatus 1 rotates the workpiece W and the gear cutter 40 in the reference synchronous rotation state while stopping the feed operation from the one rotation axis side Df to the other rotation axis side Db. The machining control unit 100 derives the correction angle β2 and the feed amount F2 based on the second path P2, and computes a rotation speed ratio (S7: correction angle changing step). At this time, the inclination angle of the axis L of the gear cutter 40 with respect to the axis Lw of the workpiece W is kept at the crossed axes angle α.

As described above, the machining control unit 100 sets the correction angle to 0° during a period from the finish of the cutting work for the right tapered tooth flank 122 to the start of the cutting work for the right subordinate tooth flank 122a. Thus, the gear machining apparatus 1 can prevent the gear cutter 40 from interfering with adjacent internal teeth 115a during the period from the finish of the cutting work for the right tapered tooth flank 122 to the start of the cutting work for the right subordinate tooth flank 122a. Further, the gear machining apparatus 1 can reduce the occurrence of a case where the cutting point C relatively moves to a position deviating from the machining path in the circumferential direction of the workpiece W. Thus, the machining accuracy can be improved. At this time, the machining control unit 100 temporarily stops the feed operation during the period from the finish of the cutting work for the right tapered tooth flank 122 to the start of the cutting work for the right subordinate tooth flank 122a. Thus, the gear machining apparatus 1 can reduce the occurrence of a case where the cutting point C relatively moves to a position deviating from the machining path in the direction of the axis Lw of the workpiece W.

When the processing of S7 is finished, the machining control unit 100 performs cutting work for the right subordinate tooth flank 122a by performing a feed operation from the one rotation axis side Df to the other rotation axis side Db while rotating the workpiece W and the gear cutter 40 at the computed rotation speed ratio (S8: second cutting step).

Processing of S9 involves determining whether the cutting work for the right subordinate tooth flank 122a is finished. When the cutting work for the right subordinate tooth flank 122a is not finished (S9: No), the machining control unit 100 repeats the processing of S9. When the cutting work for the right subordinate tooth flank 122a is finished (S9: Yes), the machining control unit 100 stops the feed operation (S10), and stops the rotation of the workpiece W and the rotation of the gear cutter 40 (S11). Then, the machining control unit 100 performs a returning operation from the other rotation axis side Db to the one rotation axis side Df (S12), and finishes this processing.

When the special tooth profile machining processing described above is finished, the machining control unit 100 adjusts the phases of the spline teeth 115a0 formed on the workpiece W and the tool edges 41 of the gear cutter 40. Then, the machining control unit 100 performs cutting work for the left tapered tooth flank 121 and the left subordinate tooth flank 121a while rotating the workpiece W and the gear cutter 40 in directions opposite to those in the cutting work for the right tapered tooth flank 122 and the right subordinate tooth flank 122a. The cutting work for the left tapered tooth flank 121 and the left subordinate tooth flank 121a is executed through processing similar to the special tooth profile machining processing.

As described above, the machining control unit 100 continuously performs the cutting work for the right tapered tooth flank 122 and the cutting work for the right subordinate tooth flank 122a, and then continuously performs the cutting work for the left tapered tooth flank 121 and the cutting work for the left subordinate tooth flank 121a. Therefore, it is possible to reduce the number of times the rotation of the workpiece W and the rotation of the gear cutter 40 are stopped. Thus, the gear machining apparatus 1 can efficiently perform the cutting work even when the two tooth flanks having different helix angles (right tapered tooth flank 122 and right subordinate tooth flank 122a) are formed on the right face 115B by cutting work. Accordingly, the cycle time can be reduced.

In the special tooth profile machining processing described above, description is given taking the exemplary case where the cutting work for the right tapered tooth flank 122 and the cutting work for the right subordinate tooth flank 122a are performed through the single feed operation. The cutting work for the right tapered tooth flank 122 and the cutting work for the right subordinate tooth flank 122a may be performed through a plurality of feed operations. In the example described above, description is given of the case where the left tapered tooth flank 121 and the left subordinate tooth flank 121a are formed after the right tapered tooth flank 122 and the right subordinate tooth flank 122a are formed. The right tapered tooth flank 122 and the right subordinate tooth flank 122a may be formed after the left tapered tooth flank 121 and the left subordinate tooth flank 121a are formed. In this case as well, the machining control unit 100 can reduce the number of times the rotation of the workpiece W and the rotation of the gear cutter 40 are stopped, and can therefore reduce the cycle time.

The gear machining apparatus 1 may form the spline teeth 115a0 by using the gear cutter 40. In this case, the gear machining apparatus 1 can eliminate a need to move the workpiece W as compared to a case where the spline teeth 115a0 are formed by broaching or gear shaping. After the spline teeth 115a0 are formed, the gear machining apparatus 1 can proceed to the machining for the gear slip preventing portions 120 without releasing the workpiece W from the workpiece holding device 30. Thus, the gear machining apparatus 1 can eliminate a need for centering before the cutting work for the gear slip preventing portions 120 is started. As a result, the gear machining apparatus 1 can reduce the cycle time and improve the machining accuracy.

In this case, the gear machining apparatus 1 can set the crossed axes angle α in the cutting work for the spline teeth 115a0 to be equal to the crossed axes angle α of the gear cutter 40 in the cutting work for the right tapered tooth flank 122 and the right subordinate tooth flank 122a. In this case, the machining control unit 100 performs the computation of the crossed axes angle, which is performed in the processing of S2 of the special tooth profile machining processing described above, before the cutting work for the spline teeth 115a0. Thus, the gear machining apparatus 1 can eliminate a need to change the inclination angle of the axis L of the gear cutter 40 with respect to the axis Lw of the workpiece W after the cutting work for the spline teeth 115a0, and can therefore reduce the cycle time.

As described above, the machining control unit 100 continuously performs the cutting work for the right tapered tooth flank 122 and the cutting work for the right subordinate tooth flank 122a during the single feed operation when the right tapered tooth flank 122 and the right subordinate tooth flank 122a are formed on the right face 115B of each spline tooth 115a0. That is, the gear machining apparatus 1 performs both the cutting work for the right tapered tooth flank 122 and the cutting work for the right subordinate tooth flank 122a while performing the feed operation.

The machining control unit 100 changes the correction angle β between the cutting work for the right tapered tooth flank 122 and the cutting work for the right subordinate tooth flank 122a. Thus, the gear machining apparatus 1 can perform dimensional management of both the right tapered tooth flank 122 and the right subordinate tooth flank 122a. Accordingly, the right tapered tooth flank 122 and the right subordinate tooth flank 122a can be formed with high accuracy.

The machining control unit 100 changes the rotation speed ratio of the workpiece W to the gear cutter 40 between the cutting work for the right tapered tooth flank 122 and the cutting work for the right subordinate tooth flank 122a. Thus, the cutting work can continuously be performed for the right tapered tooth flank 122 and the right subordinate tooth flank 122a having different helix angles while keeping the state in which the workpiece W and the gear cutter 40 rotate.

When the machining control unit 100 continuously performs the cutting work for the right tapered tooth flank 122 and the cutting work for the right subordinate tooth flank 122a during the single feed operation, the machining control unit 100 changes the correction angle β at the timing when the cutting work for the right tapered tooth flank 122 is finished. In this case, the machining control unit 100 changes the correction angle β in the state in which the workpiece W and the gear cutter 40 rotate. Thus, the gear machining apparatus 1 can reduce the cycle time as compared to, for example, the case where the gear cutter 40 is temporarily separated from the workpiece W and the workpiece W and the gear cutter 40 are temporarily stopped.

The right tapered tooth flank 122 is inclined to the one side in the circumferential direction of the workpiece W with respect to the axis Lw of the workpiece W, and the right subordinate tooth flank 122a is inclined to the other side in the circumferential direction of the workpiece W with respect to the axis Lw. When this special tooth profile is formed by the gear machining apparatus 1, the machining control unit 100 continuously performs the cutting work for the right tapered tooth flank 122 and the cutting work for the right subordinate tooth flank 122a during the single feed operation, and changes the correction angle j at the timing when the cutting work for the right tapered tooth flank 122 is finished. The machining control unit 100 sets the correction angle β to a positive angle in the cutting work for the right tapered tooth flank 122, and sets the correction angle β to a negative angle in the cutting work for the right subordinate tooth flank 122a. Thus, the machining control unit 100 can reduce the cycle time and improve the machining accuracy even if the internal tooth 115a has a special tooth profile.

The present invention has been described above based on the embodiments, but is not limited to the embodiments described above. It can easily be understood that various modifications may be made without departing from the spirit of the present invention. In the embodiments described above, the present invention is applied to the case where the gear slip preventing portions 120 are formed on the spline teeth 115a0, but the present invention is also applicable to cases other than the case where the gear slip preventing portions 120 are formed.

For example, in this embodiment, description is given of the case where the helix directions of a first tooth flank (right tapered tooth flank 122) and a second tooth flank (right subordinate tooth flank 122a) are different. The present invention is not limited to this case. That is, the present invention is also applicable to a case where the helix directions of the first tooth flank and the second tooth flank are the same. In this case, the machining control unit 100 sets the correction angle to a positive value or a negative value both in the formation of the first tooth flank and in the formation of the second tooth flank, and changes the rotation speed ratio between the formation of the first tooth flank and the formation of the second tooth flank. Thus, the first tooth flank and the second tooth flank having different helix angles can efficiently be formed with high accuracy.

In the embodiment described above, description is given of the case where the machining control unit 100 temporarily stops the feed operation during the period from the finish of the cutting work for the right tapered tooth flank 122 to the start of the cutting work for the right subordinate tooth flank 122a. The present invention is not limited to this case.

That is, the machining control unit 100 may perform the feed operation while decelerating the feed operation during the period from the finish of the cutting work for the right tapered tooth flank 122 to the start of the cutting work for the right subordinate tooth flank 122a. Further, the machining control unit 100 may perform the feed operation at a constant speed during a period from the start of the cutting work for the right tapered tooth flank 122 to the finish of the cutting work for the right subordinate tooth flank 122a.

When the machining control unit 100 computes the rotation speed ratio for the cutting work for the right tapered tooth flank 122, the machining control unit 100 may also compute the rotation speed ratio for the cutting work for the right subordinate tooth flank 122a. Thus, it is possible to reduce a time required until the cutting work for the right subordinate tooth flank 122a is started. If the gear machining apparatus 1 performs the feed operation while decelerating the feed operation during the period from the finish of the cutting work for the right tapered tooth flank 122 to the start of the cutting work for the right subordinate tooth flank 122a, it is possible to reduce the occurrence of the case where the cutting point C deviates from the machining path in the direction of the axis Lw of the workpiece W while changing the rotation speed of the workpiece W. If the gear machining apparatus 1 performs the feed operation at the constant speed during the period from the start of the cutting work for the right tapered tooth flank 122 to the finish of the cutting work for the right subordinate tooth flank 122a, the cycle time can be reduced because the feed operation is not decelerated or stopped.

What is claimed is:

1. A gear machining apparatus configured to perform cutting work for a workpiece and generate a gear by performing a feed operation of a gear cutter relative to the workpiece along a direction of an axis of the workpiece while synchronously rotating the gear cutter and the workpiece in a state in which an axis of the gear cutter is inclined with respect to a line parallel to the axis of the workpiece,
   the gear having a plurality of teeth each having a face provided with a gear slip preventing portion including:
     a first tooth flank; and
     a second tooth flank formed continuous with the first tooth flank and having a helix angle different from a helix angle of the first tooth flank,
   the gear machining apparatus comprising a machining control unit configured to control rotation of the workpiece and rotation of the gear cutter, and control the feed operation of the gear cutter relative to the workpiece, wherein
   a position where the gear cutter cuts the face is defined as a cutting point, the cutting point when the cutting work is started is defined as a start point, and the cutting point when the gear cutter is fed by a predetermined feed amount from the start point is defined as a movement point,
   the cutting point when the gear cutter is fed by the predetermined feed amount from the start point while the workpiece and the gear cutter rotate in a predetermined reference synchronous rotation state is defined as a reference movement point,
   a phase shift angle to one side in a circumferential direction of the workpiece, which is set to shift a phase of the movement point from a phase of the reference movement point when the gear cutter is fed by the predetermined feed amount from the start point, is defined as a correction angle, and
   the machining control unit is configured to continuously perform the cutting work for the first tooth flank and the cutting work for the second tooth flank during the feed operation performed on a single occasion, and change the correction angle between the cutting work for the first tooth flank and the cutting work for the second tooth flank.

2. The gear machining apparatus according to claim 1, wherein the machining control unit is configured to temporarily stop the feed operation during a period from a finish of the cutting work for the first tooth flank to a start of the cutting work for the second tooth flank.

3. The gear machining apparatus according to claim 1, wherein the machining control unit is configured to perform the feed operation while decelerating the feed operation during a period from a finish of the cutting work for the first tooth flank to a start of the cutting work for the second tooth flank.

4. The gear machining apparatus according to claim 1, wherein the machining control unit is configured to perform the feed operation at a constant speed during a period from a start of the cutting work for the first tooth flank to a finish of the cutting work for the second tooth flank.

5. The gear machining apparatus according to claim 2, wherein the machining control unit is configured to set the correction angle to 0° during the period from the finish of the cutting work for the first tooth flank to the start of the cutting work for the second tooth flank.

6. The gear machining apparatus according to claim 1, wherein the machining control unit is configured to set the correction angle to a positive angle in one of the cutting work for the first tooth flank and the cutting work for the second tooth flank, and set the correction angle to a negative angle in the other one of the cutting work for the first tooth flank and the cutting work for the second tooth flank.

7. The gear machining apparatus according to claim 1, wherein the machining control unit is configured to change a rotation speed ratio of the workpiece to the gear cutter between the cutting work for the first tooth flank and the cutting work for the second tooth flank.

8. The gear machining apparatus according to claim 7, wherein the machining control unit is configured to keep a rotation speed of one of the workpiece and the gear cutter at a constant rotation speed and change a rotation speed of the other one of the workpiece and the gear cutter in the cutting work for the first tooth flank and in the cutting work for the second tooth flank.

9. A gear machining method for performing cutting work for a workpiece and generating a gear by performing a feed operation of a gear cutter relative to the workpiece along a direction of an axis of the workpiece while synchronously rotating the gear cutter and the workpiece in a state in which an axis of the gear cutter is inclined with respect to a line parallel to the axis of the workpiece, wherein
   the gear has a plurality of teeth each having a face provided with a gear slip preventing portion including:
     a first tooth flank; and
     a second tooth flank formed continuous with the first tooth flank and having a helix angle different from a helix angle of the first tooth flank,
   a position where the gear cutter cuts the face is defined as a cutting point, the cutting point when the cutting work is started is defined as a start point, and the cutting point when the gear cutter is fed by a predetermined feed amount from the start point is defined as a movement point, the cutting point when the gear cutter is fed by the predetermined feed amount from the start point while the workpiece and the gear cutter rotate in a predetermined reference synchronous rotation state is defined as a reference movement point, and a phase shill angle to one side in a circumferential direction of the workpiece, which is set to shift a phase of the movement point from a phase of the reference movement point when the gear cutter is fed by the predetermined feed amount from the start point, is defined as a correction angle, the gear machining method comprising continuously performing the cutting work for the first tooth flank and the cutting work for the second tooth flank during the feed operation performed on a single occasion, and changing the correction angle between the cutting work for the first tooth flank and the cutting work for the second tooth flank.

10. The gear machining method according to claim 9, further comprising:

cutting the first tooth flank in a state in which the correction angle is set to a first angle;

changing the correction angle from the first angle to a second angle while rotating the workpiece and the gear cutter; and cutting the second tooth flank in a state in which the correction angle is set to the second angle.

11. The gear machining method according to claim 10, wherein the changing the correction angle is performed in a state in which the feed operation is stopped.

12. The gear machining method according to claim 10, wherein the changing the correction angle is performed while decelerating the feed operation.

13. The gear machining method according to claim 10, wherein the changing the correction angle is performed in a state in which a speed of the feed operation is set to the same speed between the cutting the first tooth flank and the cutting the second tooth flank.

14. The gear machining method according to claim 11, wherein the changing the correction angle is performed in a state in which the correction angle is set to 0°.

* * * * *